US006396381B1

(12) United States Patent
Takeda

(10) Patent No.: US 6,396,381 B1
(45) Date of Patent: May 28, 2002

(54) THERMAL PROTECTOR

(75) Inventor: Hideaki Takeda, Misato (JP)

(73) Assignee: Uchiya Thermostat Co., Ltd., Saitama-ken (JP)

( * ) Notice: Subject to any disclaimer, the term of this patent is extended or adjusted under 35 U.S.C. 154(b) by 52 days.

(21) Appl. No.: 09/611,525

(22) Filed: Jul. 6, 2000

(30) Foreign Application Priority Data

Jul. 22, 1999 (JP) .......................................... 11-207941

(51) Int. Cl.$^{7}$ ........................ H01H 37/14; H01H 37/46; H01H 37/52; H02H 5/04

(52) U.S. Cl. ........................ 337/377; 337/342; 337/343; 361/103

(58) Field of Search ................................ 337/298, 333, 337/377, 380, 381, 342, 343; 361/103

(56) References Cited

U.S. PATENT DOCUMENTS 3,223,808 A * 12/1965 Wehl .......................... 337/360
3,443,259 A * 5/1969 Wehl et al. ................. 337/368
3,525,914 A * 8/1970 Vind .......................... 318/792
3,840,834 A * 10/1974 Obenhaus et al. .......... 337/107
4,208,646 A * 6/1980 Taylor ........................ 337/365
4,262,273 A * 4/1981 Grable ........................ 337/67
4,319,126 A * 3/1982 Lujic .......................... 219/494
4,379,278 A * 4/1983 Kuczynski et al. ........... 337/68
4,507,642 A * 3/1985 Blackburn .................. 337/111
4,532,488 A * 7/1985 Blackburn .................. 337/111
4,563,667 A * 1/1986 Hofsass ...................... 337/349
4,755,787 A * 7/1988 Wehl .......................... 337/372
4,894,634 A * 1/1990 Nezuka et al. .............. 337/343
5,309,131 A * 5/1994 Hofsass et al. ............. 337/102
5,428,336 A * 6/1995 Smith et al. ................ 337/365
5,607,610 A * 3/1997 Furukawa ................... 219/488
5,757,262 A * 5/1998 Takeda ....................... 337/333
5,796,327 A * 8/1998 Smith ......................... 337/333
5,804,798 A * 9/1998 Takeda ....................... 219/494
5,936,510 A * 8/1999 Wehl .......................... 337/100
5,973,587 A * 10/1999 Hofsass ...................... 337/333
6,020,807 A * 2/2000 Givler ........................ 337/141
6,249,210 B1 * 6/2001 Hofsass ...................... 337/324
6,300,860 B1 * 10/2001 Hofsass ...................... 337/100

FOREIGN PATENT DOCUMENTS

DE 2 113 388 10/1971
EP 0507425 A1 * 10/1992 .......... H01H/61/02
JP 5-282977 A * 10/1993 .......... H01H/37/74
JP A7282701 10/1995
JP 10-162702 A * 6/1998 .......... H01H/37/04
JP 11-297174 A * 10/1999 .......... H01H/37/54
JP 2001-6510 A * 1/2001 .......... H01H/61/02

* cited by examiner

*Primary Examiner*—Leo P. Picard
*Assistant Examiner*—Anatoly Vortman
(74) *Attorney, Agent, or Firm*—Birch, Stewart, Kolasch & Birch, LLP

(57) ABSTRACT

The central portion of a movable plate 40 is cut into a U shape to form a tongue 43 provided along the longitudinal axis of the movable plate 40, the tongue 43 is brought into close contact with an upper electrode face 31 of a heating resistor 30, a lower electrode face 32 of the heating resistor 30 is brought into contact with a fixed plate 10, and portions of the movable plate 40 located on both sides of a cut 46 operate as an elastic arm 47.

10 Claims, 8 Drawing Sheets

THERMAL PROTECTOR

FIELD OF THE INVENTION AND RELATED ART

The present invention relates to a thermal protector built into a transformer, a motor, or the like. More particularly, it relates to a self-holding type thermal protector that incorporates a heating resistor consisting of a PTC (Positive Temperature Coefficient) element to maintain the open state by means of heat generated in the heating resistor.

There has been proposed a thermal protector that incorporates a PTC element such as a positive thermistor as a heating resistor to maintain the open state by means of heat generated in the heating resistor.

FIG. 12 shows a thermal protector of this type proposed in Japanese Patent Provisional Publication No. 7-282701.

In this thermal protector, a load current flows in the order of a terminal a for external connection, a bimetal b, a movable contact c, a fixed contact d, a fixed electrode e, and a terminal f for external connection or in the order reverse to the above.

When the temperature of the bimetal b is increased to a predetermined operating temperature by overcurrent or heat applied from a load, the bimetal b performs a reversing operation, so that the movable contact c separates from the fixed contact d, by which the current flowing to the load is interrupted.

Between the proximal portion of the bimetal b and the fixed electrode e, a positive thermistor g, which is a PTC element, is disposed. When the movable contact c separates from the fixed contact d, the voltage across the terminals a and f is applied to the thermistor g, so that the thermistor g becomes in an energized state to generate heat.

When the thermistor g generates heat, the heat is transmitted to the bimetal b, whereby the reversed state of the bimetal b is maintained.

The above-described conventional thermal protector, in which the lower face of the proximal end portion of the bimetal b is in direct contact with the thermistor g, offers an advantage that the heat generated by the thermistor g is transmitted efficiently to the bimetal b. However, it has the disadvantages described below.

The face on the highly expanded side (lower face) of the bimetal b has a bad surface condition due to oxidation etc., and also has a high electrical resistance. In the conventional thermal protector, in which the face on the highly expanded side of the bimetal b is in contact with the electrode face of the thermistor g, the stability of electrical contact of the bimetal b with the thermistor g is insufficient. Therefore, there is a possibility that a proper heating current does not flow in the thermistor g after the bimetal b is reversed.

OBJECT AND SUMMARY OF THE INVENTION

The present invention has been made in view of the above situation, and accordingly an object thereof is to provide a thermal protector in which the electrical conductivity of a heating resistor consisting of a PTC element is not impaired, and the heat generated in the heating resistor can be transmitted efficiently to a bimetal.

To achieve the above object, the present invention provides a thermal protector comprising: a conductive fixed plate having a fixed contact at one end and formed with a first terminal for external connection at the other end; a movable plate having elasticity and conductivity provided with a movable contact at one end, the movable contact being brought into contact with the fixed contact by the elastic force; a second terminal for external connection connected to the movable plate; a bimetal performing a reversing operation when the temperature thereof exceeds a predetermined value, whereby the movable plate is displaced by the reversing force of the bimetal to separate the movable contact from the fixed contact; and a heating resistor, consisting of a PTC element, interposed between the fixed plate and the movable plate, wherein the central portion of the movable plate is cut into a U shape to form a tongue provided along the longitudinal axis of the movable plate, the tongue is brought into close contact with an upper electrode face of the heating resistor, a lower electrode face of the resistor is brought into contact with the fixed plate, and portions of the movable plate located on both sides of the cut operate as an elastic arm.

In an embodiment of the present invention, the bimetal is arranged in parallel above the movable plate so that one end portion thereof is engaged with the front end of the movable plate and the other end portion thereof is engaged above the tongue, and the front end height of the movable plate in a state in which the bimetal is not reversed is set at a height such that a part of the bimetal can be brought into contact with the upper face of the tongue when the bimetal is reversed.

In an embodiment of the present invention, the front end height of the movable plate in a state in which the bimetal is not reversed is set not higher than the height of the upper electrode face of the heating resistor.

In an embodiment of the present invention, a protrusion serving as a reversing fulcrum for the bimetal is provided on the tongue.

In an embodiment of the present invention, an elastic raised portion with a wavelike cross section is formed at a portion contacting with the lower electrode face of the heating resistor on the fixed plate so that the raised portion is elastically brought into contact with the lower electrode face.

In an embodiment of the present invention, a plurality of the raised portions are formed in the longitudinal direction of the fixed plate, and the height of the lower end of a trough portion formed between the raised portions is set not lower than the upper face height of a flat portion of the fixed plate.

In an embodiment of the present invention, the lower end of the trough portion is formed flat.

In an embodiment of the present invention, the contact surface of the tongue with the upper electrode face of the heating resistor and the contact surface of the fixed plate with the lower electrode face of the heating resistor are subjected to surface treatment to improve the electrical contact stability.

In an embodiment of the present invention, conductive paste is interposed between the upper electrode face of the heating resistor and the tongue and between the lower electrode face of the heating resistor and the fixed plate to improve the electrical contact stability.

In an embodiment of the present invention, in a first mode of the invention, the bimetal is arranged in parallel above the movable plate so that one end portion thereof is engaged with the front end of the movable plate and the other end portion thereof is engaged above the tongue, and a protrusion brought into contact with the reversed bimetal is provided on the tongue.

The present invention achieves the following effects.

(1) A new part for incorporating the heating resistor consisting of a PTC element need not be added, so that the thermal protector can be constructed with an equal number of parts to the number of parts for the conventional thermal protector using the movable plate.

(2) Since electricity is conducted to the heating resistor via the movable plate, the electrical conductivity of the heating resistor is improved.

(3) Since the heating resistor is carried by a part of the movable plate to which the bimetal is attached, there is provided an advantage on the heat transfer surface that the heating efficiency of the bimetal is increased.

(4) Since the narrow arm portions are formed on both sides of the tongue provided on the movable plate, the movable plate is displaced easily. Therefore, a load at the time when the bimetal is reversed is reduced, so that the operating characteristics of the bimetal are stabilized.

(5) When the bimetal is reversed, the bimetal can be brought into contact with the tongue of the movable plate in close contact with the heating resistor, so that the heat generated in the heating resistor is transmitted efficiently to the bimetal. As a result, the reversed state of the bimetal can be held stably.

(6) Since the elastic raised portion with a wavelike cross section is formed on the fixed plate, any dimensional error of the heating resistor is absorbed, so that the upper electrode face of the heating resistor can be pressed on the lower face of the tongue of the movable plate, which is a reference plane. Therefore, the electrical contact stability of the heating resistor is improved. Also, since the contact area of the fixed plate with the heating resistor decreases, the outflow of heating energy of the heating resistor to the fixed plate is restrained to the utmost. As a result, a loss of heating energy of the heating resistor is reduced.

DETAILED DESCRIPTION OF THE PREFERRED EMBODIMENTS

Figure 1:
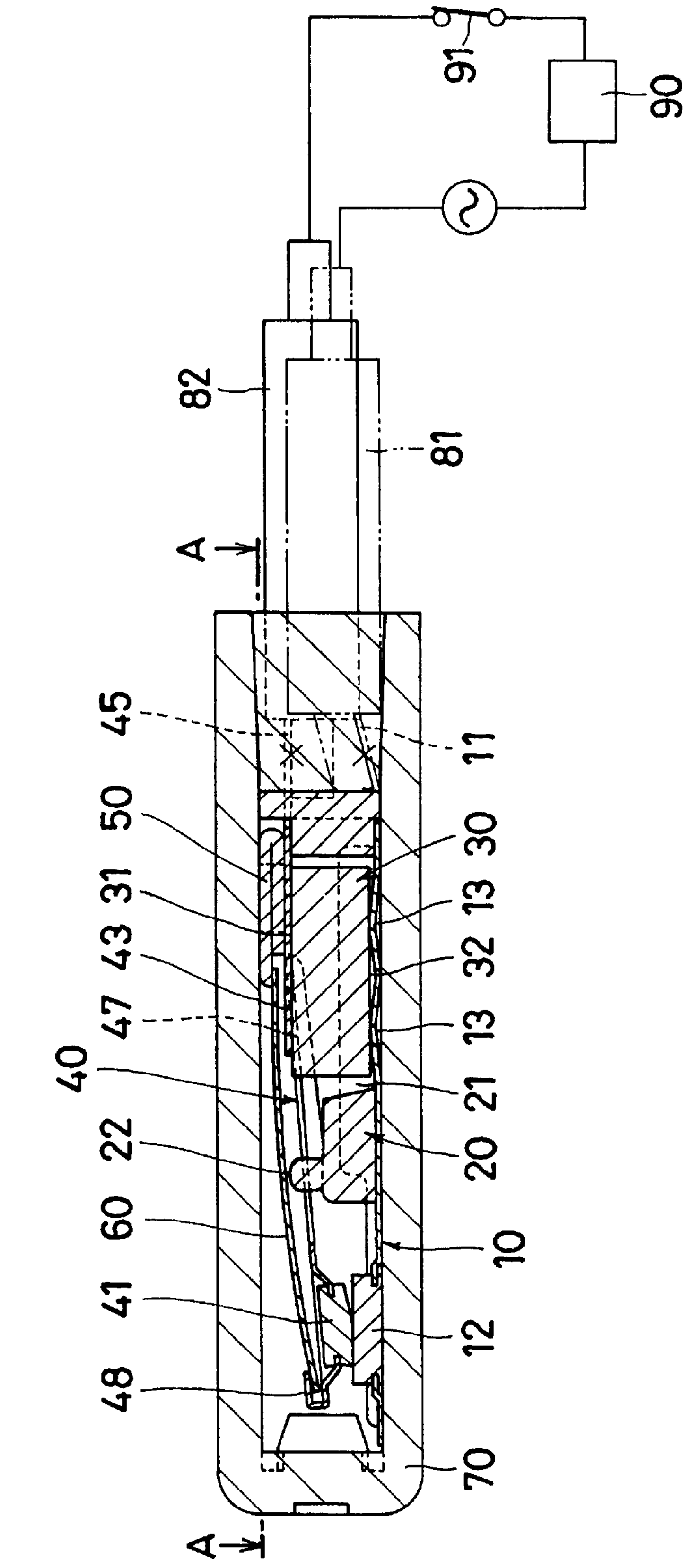
FIG. 1 is a longitudinal sectional view showing a construction of a thermal protector in accordance with the present invention.
Figure 2:
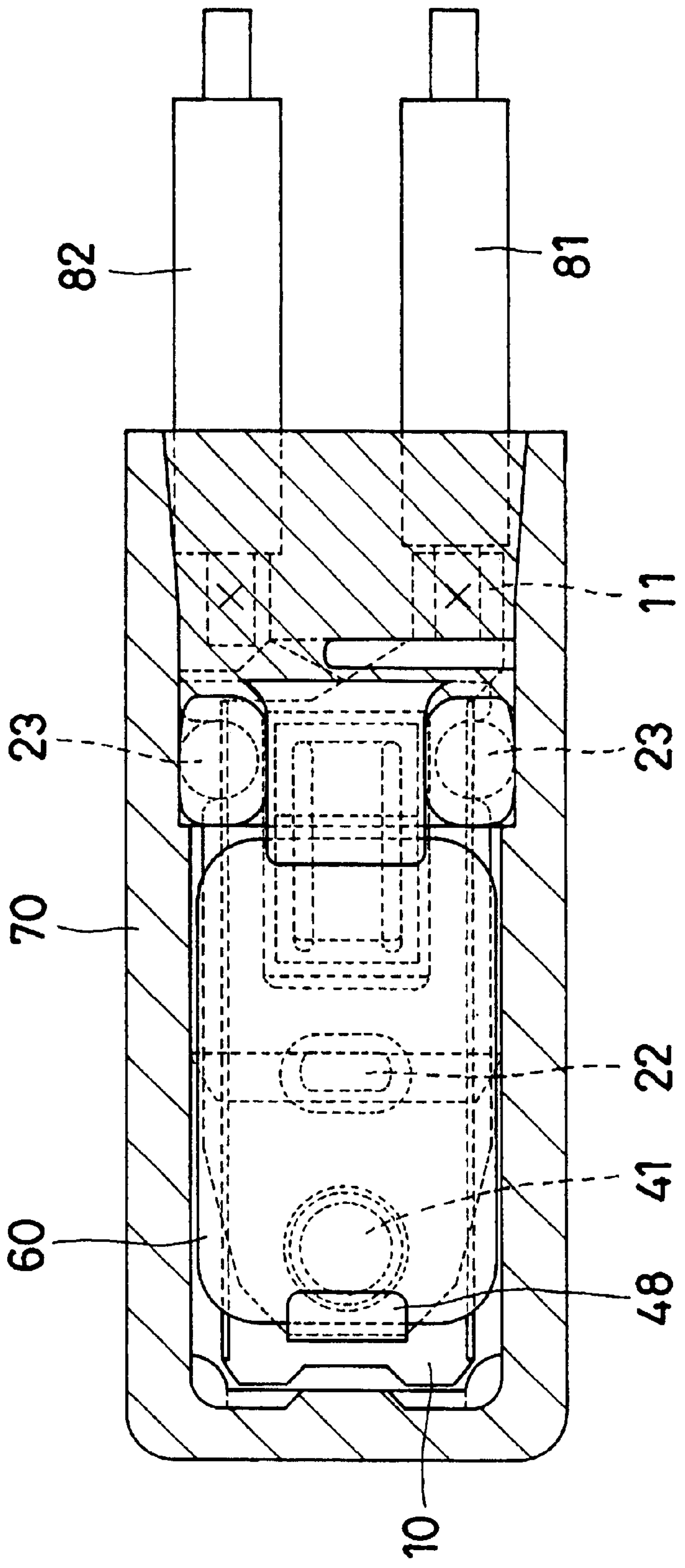
FIG. 2 is a sectional view taken along the line A—A of FIG. 1.
Figure 3:
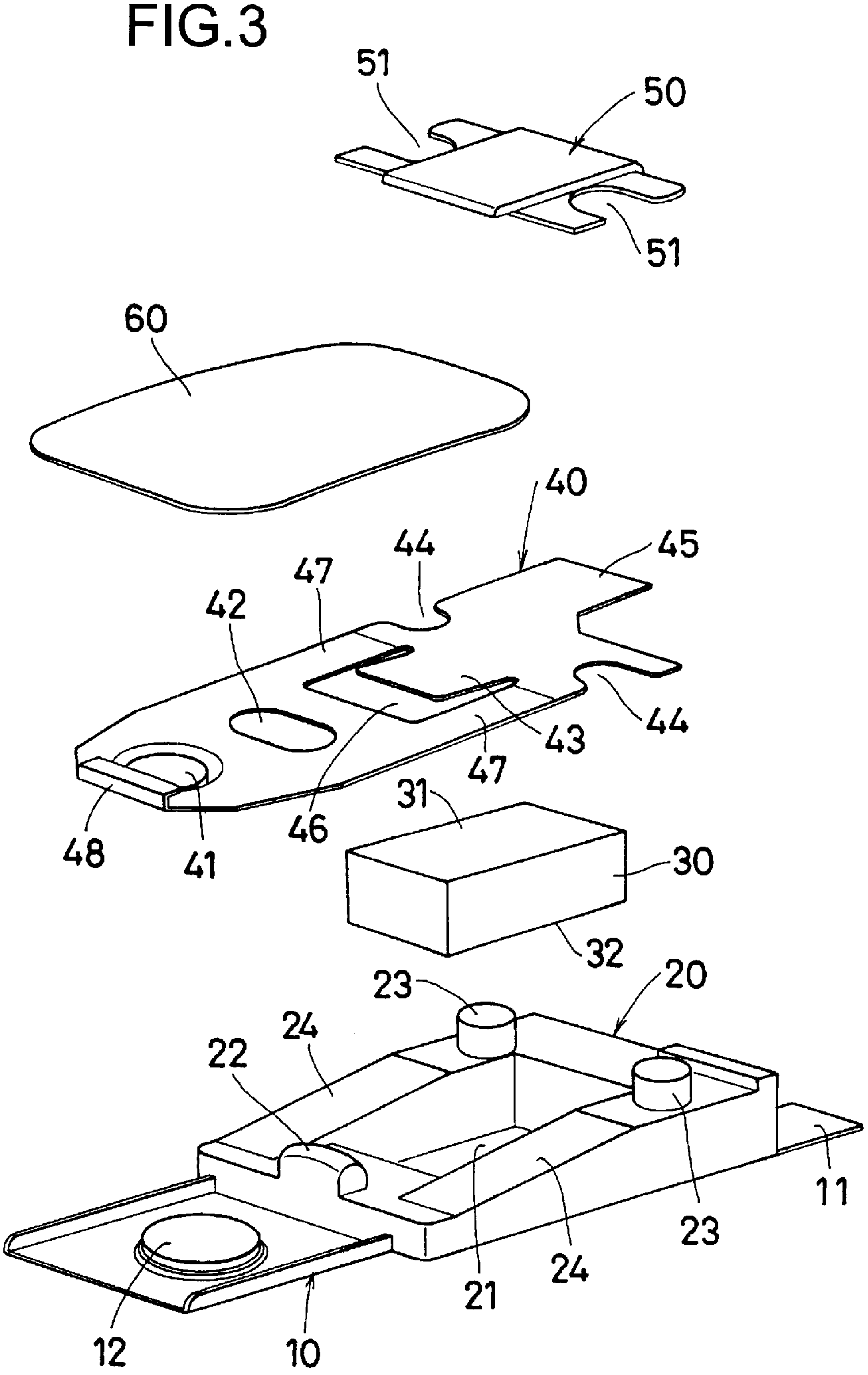
FIG. 3 is an exploded perspective view of a thermal protector in accordance with the present invention.

FIG. 1 is a longitudinal sectional view showing one embodiment of a thermal protector in accordance with the present invention, FIG. 2 is a sectional view taken along the line A—A of FIG. 1, and FIG. 3 is an exploded perspective view of the thermal protector shown in FIG. 1.

In these figures, a fixed plate 10, consisting of an elastic metal plate, is formed with a terminal 11 for external connection at the rear end portion thereof and provided with a fixed contact 12 at the front end portion thereof.

On the fixed plate 10 is fixedly disposed a support lock 20 formed of an electrical insulating resin material. The support block 20 is formed with a quadrangular hole 21 penetrating the central portion thereof, and this hole 21 accommodates a rectangular heating resistor 30 consisting of a PTC element as shown in FIG. 3. Also, the support block 20 is formed with a protrusion 22 in the upper face center at the front end portion thereof and formed with columns 23 on both sides on the upper face at the rear end portion thereof.

Above the support block 20 is disposed a movable plate 40 consisting of an elastic metal plate. The movable plate 40 is provided with a movable contact 41 formed at the front end portion thereof so as to be opposed to the fixed contact 12, a relief hole 42 formed on the rear side of the movable contact 41, a tongue 43 provided on the rear side of the relief hole 42, notches 44 formed on both sides at the rear end portion, and a terminal 45 for external connection formed at the rear end.

Figure 4:
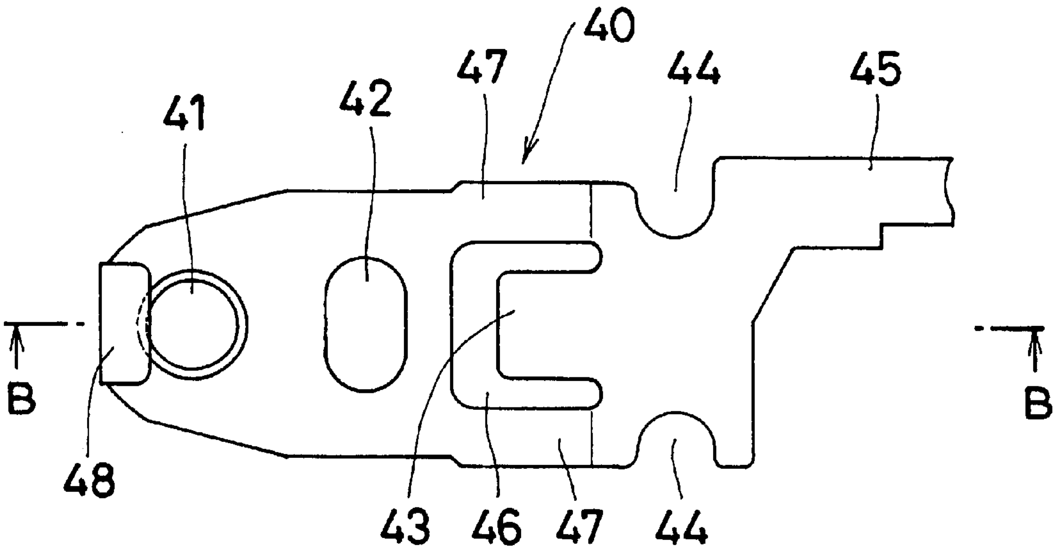
FIG. 4 is a plan view of a movable plate.

The tongue 43 is formed by providing a U-shaped cut 46 as shown in FIG. 4 at the central portion of the movable plate 40. The tongue 43 is provided along the longitudinal axis of the movable plate 40, and the tip end thereof is located on the side of the contact 41.

Figure 5:
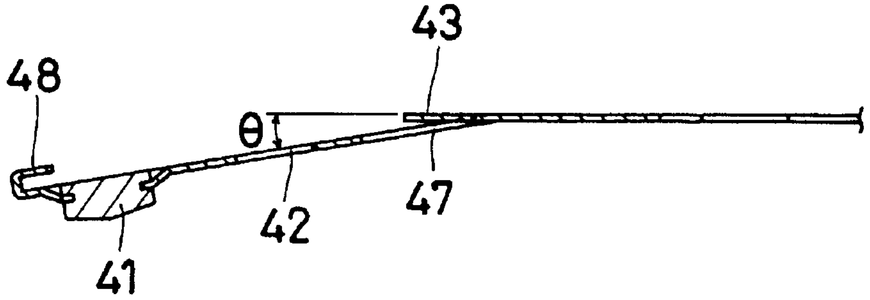
FIG. 5 is a sectional view taken along the line B—B of FIG. 4.

The movable plate 40 provided with the cut 46 is formed with elastic arm portions 47 with a narrow width on both sides of the tongue 43. As shown in FIG. 5, which is a sectional view taken along the line B—B of FIG. 4, the arm portions 47 are bent downward at the rear end of the cut 46, and therefore the front half portion of the movable plate 40 including the arm portions 47 is inclined at an angle of θ with respect to the tongue 43.

The notches 44 of the movable plate 40 are fitted on the columns 23 of the support block 20, and notches 51 formed on both sides of a fixed metal 50, which is lapped on the upper face at the rear end portion of the movable plate 40, are also fitted on the columns 23 of the support block 20. After the notches 44 and 51 are fitted on the columns 23, the tops of the columns 23 are crushed while being heated. Therefore, the rear end portion of the movable plate 40 is held between the lower face of the fixed metal 50 and the upper face at the rear end portion of the support block 20.

As shown in FIG. 1, the movable plate 40 supported on the support block 20 presses, by its elasticity, the movable contact 41 on the fixed contact 12 to bring these contacts into contact with one another. At this time, the protrusion 22 of the support block 20 is located in the relief hole 42, and the tongue 43 is in close contact with an upper electrode face 31 (see FIG. 3) of the heating resistor 30.

In the normal state in which the movable contact 41 of the movable plate 40 is pressed on and brought into contact with the fixed contact 12 (see FIG. 1), the front end of the movable plate 40 is located at a position lower than the upper electrode face 31 of the heating resistor 30. In this state, the arm portions 47 are located at the sides of the heating resistor 30.

Since the support block 20 is formed with a slanting face 24 shown in FIG. 3 at the front half portion thereof, the contact of the support block 20 with the arm portions 47 is avoided.

On the movable plate 40 is placed a bimetal 60, which is a heat responsive element. One end of the bimetal 60 is locked to a claw 48 provided at the front end of the movable plate 40 and the other end thereof is locked to the lower face at the front end portion of the fixed metal 50.

Figure 6:
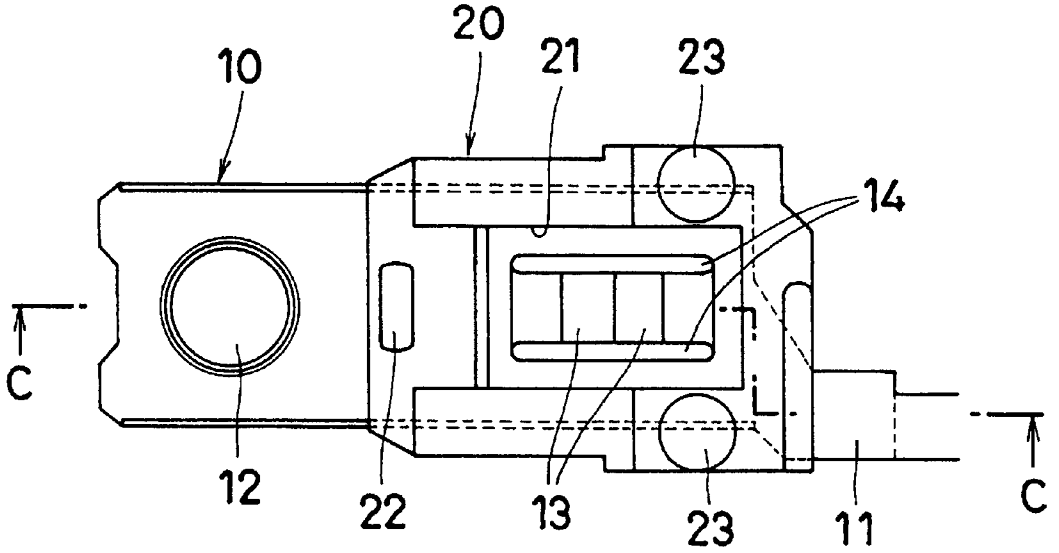
FIG. 6 is a plan view of a fixed plate to which a support block is attached.
Figure 7:
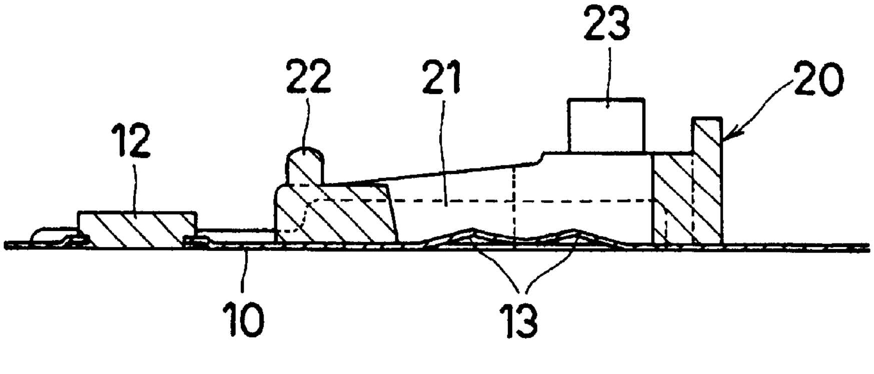
FIG. 7 is a sectional view taken along the line C—C of FIG. 6.

FIG. 6 is a plan view of the fixed plate 10 to which the support block 20 is attached, and FIG. 7 is a sectional view taken along the line C—C of FIG. 6.

As shown in FIG. 7, the fixed plate 10 is formed with two raised portions 13 having a wavelike cross section located under the hole 21 of the support block 20. These raised portions 13 are located adjacently in the lengthwise direction of the fixed plate 10, and are formed by pressing a portion between a pair of slits 14 in parallel with one another, shown in FIG. 6, into a waveform.

The height of the lower end of a trough portion between the raised portions 13 is set equal to or greater than the upper face height of a flat portion of the fixed plate 10. Since the raised portions 13 have vertical elasticity, they abut elastically on a lower electrode face 32 of the heating resistor 30 as shown in FIG. 1.

The raised portions 13 urge the heating resistor 30 upward by its elasticity. Even if the height dimension of the heating resistor 30 has an error, therefore, this error is absorbed by the elasticity of the raised portions 13. As a result, the electrical contact between the tongue 43 and the upper electrode 31 of the heating resistor 30 and the electrical contact between the fixed plate 10 and the lower electrode 32 of the heating resistor 30 are made stable. Also, the upper electrode face 31 of the heating resistor 30 is set stably as a stationary reference plane.

If the contact surface of the tongue 43 with the upper electrode face 31 of the heating resistor 30 and the contact surface of the raised portions 13 with the lower electrode face 32 of the heating resistor 30 are subjected to surface treatment (for example, plating) to improve the electrical contact stability, the stability of electrical contact of the tongue 43 and the fixed plate 10 with the heating resistor 30 can be improved further.

The electrical contact stability can also be improved by using a method other than the surface treatment. Specifically, if conductive paste is interposed between the upper electrode face 31 of the heating resistor 30 and the tongue 43 and between the lower electrode face 32 of the heating resistor 30 and the fixed plate 10, greatly superior contact stability can be provided.

The mechanism elements thus assembled are inserted into a casing 70. The opening of the casing 70 is sealed by a resin or the like. The terminal 11 for external connection formed at the rear end of the fixed plate 10 is connected with a lead wire 81, and the terminal 45 for external connection formed at the rear end of the movable plate 40 is connected with a lead wire 82.

In the above-described thermal protector, a load current flows in the order of the terminal 11 for external connection, the fixed plate 10, the fixed contact 12, the movable contact 41, the movable plate 40, and the terminal 45 or in the order reverse to the above.

Figure 8:
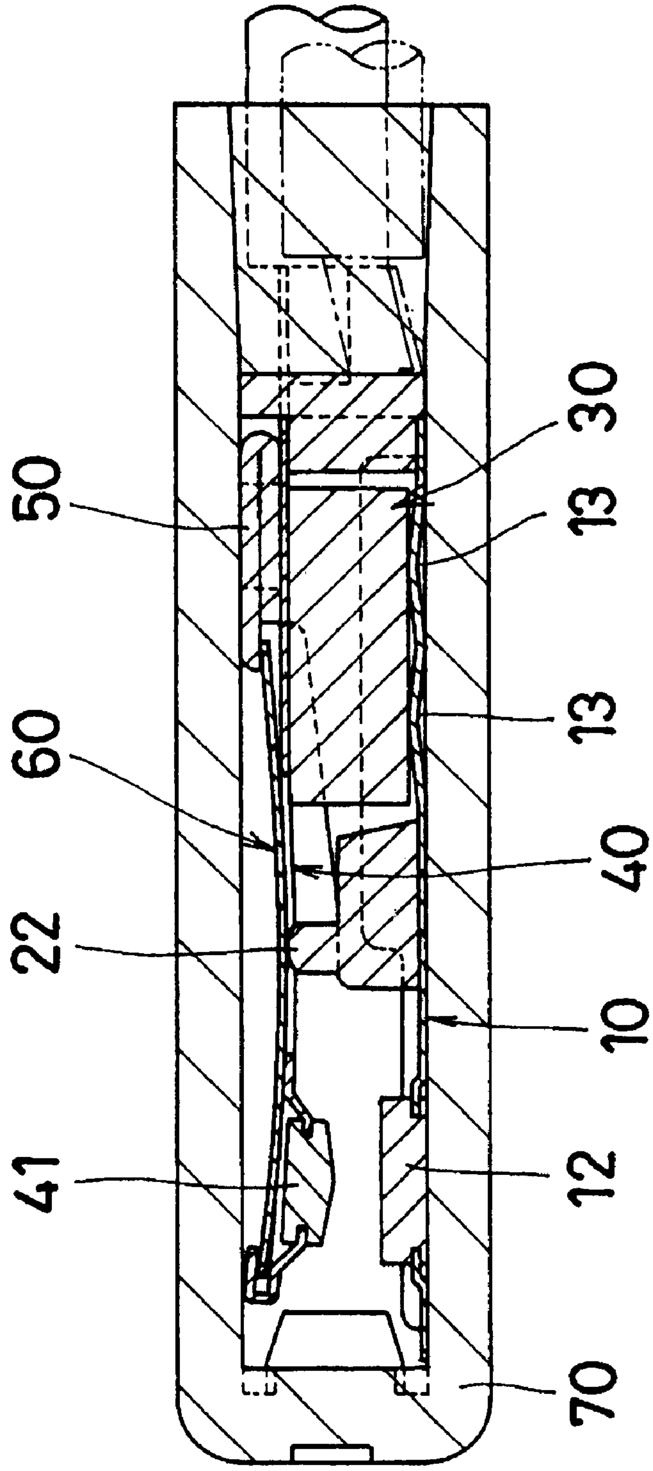
FIG. 8 is a longitudinal sectional view showing a state in which a bimetal performs a reversing operation.

When the temperature of the bimetal 60 is increased to a predetermined operating temperature by heat generation in the movable plate 40 due to overcurrent or by overheating of a load 90 (see FIG. 1), the bimetal 60 performs a reversing operation with the protrusion 22 of the support block 20 being a fulcrum as shown in FIG. 8. Therefore, the movable contact 41 is separated from the fixed contact 12 by a reversing force of the bimetal 60, with the result that the current flowing to the load 90 is interrupted.

The lower face at the rear end portion of the reversed bimetal 60 abuts on the upper face at the tip end portion of the tongue 43 of the movable plate 40. This is because the height of the front end of the movable plate 40 in the state in which the movable contact 41 is pressed on and brought into contact with the fixed contact 12 is set at a height not greater than the height of the upper electrode face 31 of the heating resistor 30.

If the front end height of the movable plate 40 in the normal state is greater than the height of the upper electrode face 31, the height of the protrusion 22 serving as a fulcrum should be increased accordingly. In this case, the lower face at the rear end portion of the bimetal 60 is greatly separated from the upper face at the tip end portion of the tongue 43. When the bimetal 60 is reversed, therefore, the lower face at the rear end portion thereof cannot be caused to abut sufficiently on the tongue 43.

When the movable contact 41 is separated from the fixed contact 12 by the reversing operation of the bimetal 60, the voltage generated in the terminals 11 and 45 for external connection is applied to the heating resistor 30, so that the heating resistor 30 becomes in an energized state to generate heat.

When the heating resistor 30 generates heat, the heat is transmitted to the bimetal 60 via an inside space. Also, since a part of the bimetal 60 is in contact with the tongue 43 of the movable plate 40 that is in close contact with the resistor 30, the heat in the heating resistor 30 is directly transmitted to the bimetal 60 via this contacting portion. As a result, the bimetal 60 maintains the reversed state, and continues the open state of the movable contact 41.

If a power supply switch 91 shown in FIG. 1 is turned off, the current flowing to the heating resistor 30 is interrupted. Therefore, the bimetal 60 returns to the position shown in FIG. 1, so that the movable contact 41 comes again into contact with the fixed contact 12.

Although the bimetal 60 is reversed with the protrusion 22 provided on the support block 20 being a fulcrum in the above-described embodiment, the protrusion serving as a fulcrum can be provided on the tongue 43 of the movable plate 40. In this case, however, it is desirable that the positions, shapes, etc. of the heating resistor 30 and the tongue 43 be set so that the protrusion is positioned on the center side in the longitudinal direction of the bimetal 60.

In the case where the protrusion serving as a fulcrum for reversing the bimetal 60 is provided on the tongue 43 in this manner, the bimetal 60 comes into contact with this contact, so that the heat in the heating resistor 30 is transmitted more efficiently to the bimetal 60.

Figure 9:
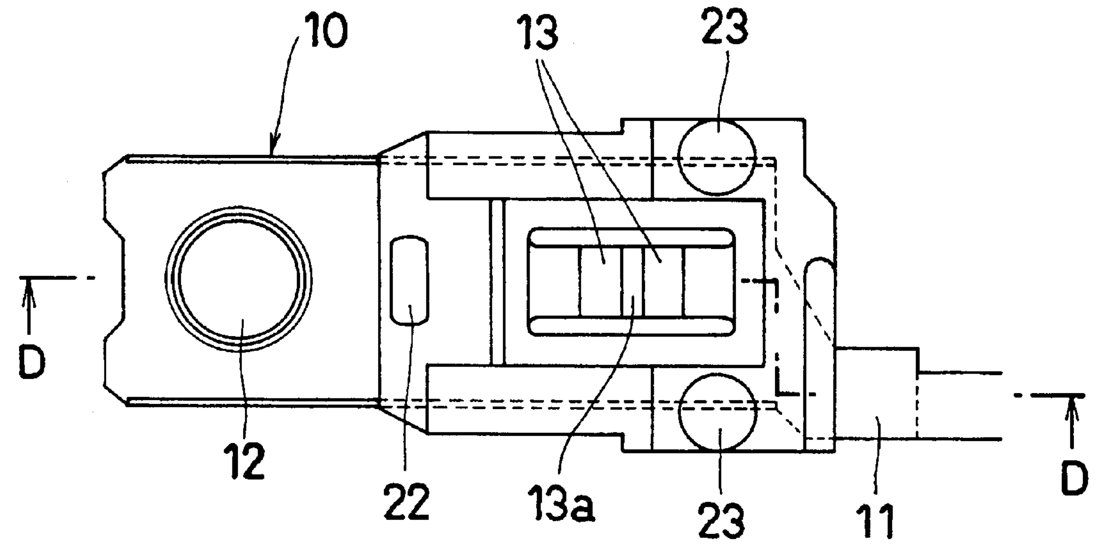
FIG. 9 is a plan view showing another embodiment of the present invention.
Figure 10:
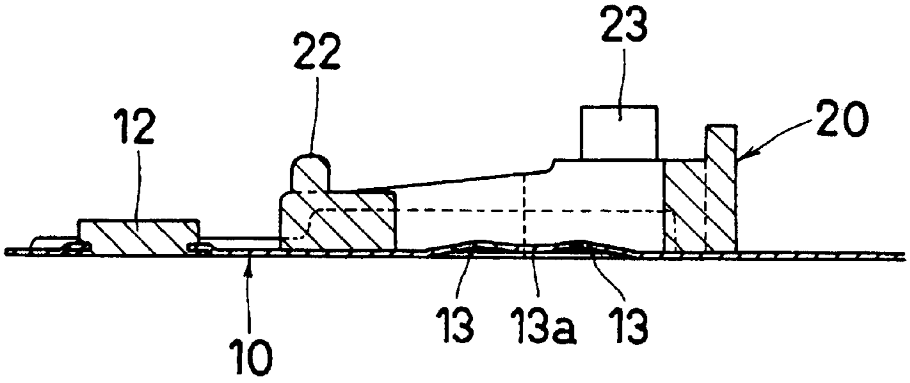
FIG. 10 is a sectional view taken along the line D—D of FIG. 9.

FIG. 9 and FIG. 10, which is a sectional view taken along the line D—D of FIG. 9, show another embodiment of the present invention. Although the trough portion is present between the two elastic raised portions 13 provided on the fixed plate 10 in the above-described embodiment, a flat portion 13*a* is formed at the lower end of the trough portion in this embodiment. If the flat portion 13*a* is provided, the contact area increases when the trough portion 13*a* is pressed on the inside surface of the casing 70 shown in FIG. 1 by the reaction force applied from the heat generating element 30 to the elastic raised portions 13. Even if the raised portions 13 are heated by the heat generated in the heating resistor 30, therefore, the trough portion is prevented from biting into the inside surface of the casing 70.

Figure 11:
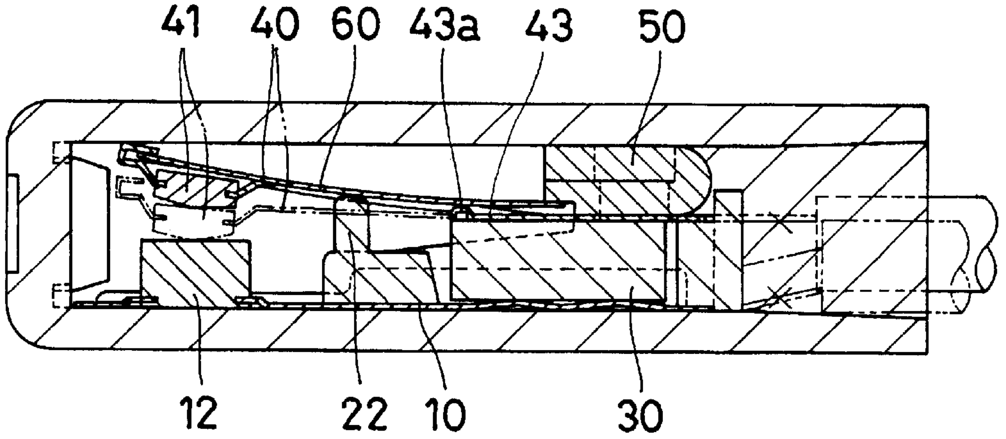
FIG. 11 is a longitudinal sectional view showing still another embodiment of the present invention.
Figure 12:
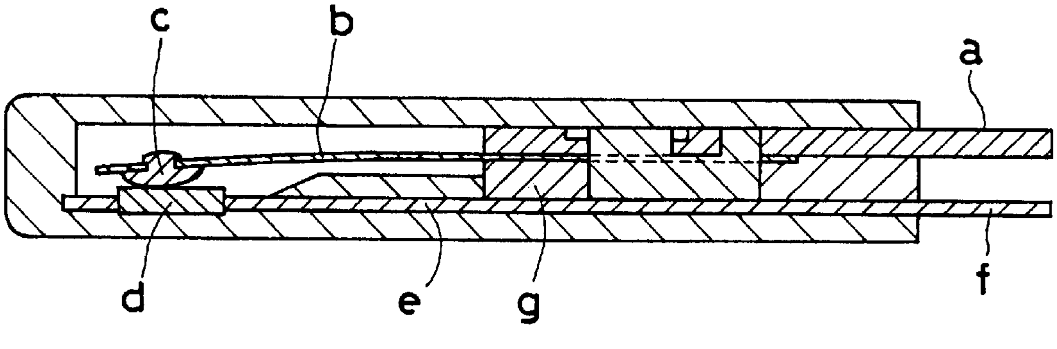
FIG.12 (PRIOR ART)
FIG. 12 is a longitudinal sectional view showing a construction of a conventional thermal protector.

FIG. 11 shows still another embodiment of the present invention. The construction of a thermal protector of this embodiment differs from that of the thermal protector of the above-described embodiments in that the shape of the movable plate 40 and the height of the fixed contact 12 are set so that the front end height of the movable plate 40 in the normal state (see the chain line) is not lower than the height of the upper face of the heating resistor 30, and in that a protrusion 43*a* facing the bimetal 60 is provided at the tip end portion of the tongue 43.

According to the thermal protector of this embodiment, when the bimetal 60 is reversed as indicated by the solid line, the lower face at the rear end portion of the bimetal 60 is located above the upper face of the tongue 43. However, the protrusion 43a provided on the tongue 43 comes into contact with the lower face at the rear end portion of the reversed bimetal 60, so that, like the thermal protector of the above-described embodiments, the heat generated in the heating resistor 30 can be transmitted efficiently to the bimetal 60 via the tongue 43.

The height of the protrusion 43*a* does not cause a hindrance to the reversing operation of the bimetal 60, that is, it is set at an appropriate value that does not restrain the reversing operation.

Although the tongue 43 is provided so that the tip end thereof is located on the side of the movable contact 41 in the above-described embodiments, the tongue 43 can be formed so that the tip end thereof is located on the side of the terminal 45.

What is claimed is:

1. A thermal protector comprising:

a conductive fixed plate having a fixed contact at one end and formed with a first terminal for external connection at the other end;

a movable plate having elasticity and conductivity provided with a movable contact at one end, said movable contact being brought into contact with said fixed contact by the elastic force;

a second terminal for external connection connected to said movable plate;

a bimetal performing a reversing operation when the temperature thereof exceeds a predetermined value, whereby said movable plate is displaced by the reversing force of said bimetal to separate said movable contact from said fixed contact; and a heating resistor, consisting of a PTC element, interposed between said fixed plate and said movable plate, wherein the central portion of said movable plate is cut into a U shape to form a tongue provided along the longitudinal axis of said movable plate, said tongue is brought into close contact with an upper electrode face of said heating resistor, a lower electrode face of said resistor is brought into contact with said fixed plate, and portions of said movable plate located on both sides of said cut operate as an elastic arm.

2. The thermal protector according to claim 1, wherein said bimetal is arranged in parallel above said movable plate so that one end portion thereof is engaged with the front end of said movable plate and the other end portion thereof is engaged above said tongue, and the front end height of said movable plate in a state in which said bimetal is not reversed is set at a height such that a part of said bimetal can be brought into contact with the upper face of said tongue when said bimetal is reversed.

3. The thermal protector according to claim 2, wherein the front end height of said movable plate in a state in which said bimetal is not reversed is set not higher than the height of the upper electrode face of said heating resistor.

4. The thermal protector according to claim 2, wherein a protrusion serving as a reversing fulcrum for said bimetal is provided on said tongue.

5. The thermal protector according to claim 1, wherein an elastic raised portion with a wavelike cross section is formed at a portion contacting with the lower electrode face of said heating resistor on said fixed plate so that said raised portion is elastically brought into contact with said lower electrode face.

6. The thermal protector according to claim 5, wherein a plurality of said raised portions are formed in the longitudinal direction of said fixed plate, and the height of the lower end of a trough portion formed between said raised portions is set not lower than the upper face height of a flat portion of said fixed plate.

7. The thermal protector according to claim 6, wherein the lower and of said trough portion is formed flat.

8. The thermal protector according to claim 1, wherein the contact surface of said tongue with the upper electrode face of said heating resistor and the contact surface of said fixed plate with the lower electrode face of said heating resistor are subjected to surface treatment to improve the electrical contact stability.

9. The thermal protector according to claim 1, wherein conductive paste is interposed between the upper electrode face of said heating resistor and said tongue and between the lower electrode face of said heating resistor and said fixed plate to improve the electrical contact stability.

10. The thermal protector according to claim 1, wherein said bimetal is arranged in parallel above said movable plate so that one end portion thereof is engaged with the front end of said movable plate and the other end portion thereof is engaged above said tongue, and a protrusion brought into contact with the reversed bimetal is provided on said tongue.

* * * * *